US012354337B1

(12) United States Patent
Kheradmand et al.

(10) Patent No.: US 12,354,337 B1
(45) Date of Patent: Jul. 8, 2025

(54) IMAGE GENERATION BASED ON A MULTI-IMAGE SET AND POSE DATA

(71) Applicant: Amazon Technologies, Inc., Seattle, WA (US)

(72) Inventors: Amin Kheradmand, Mountain View, CA (US); Jiayun Wang, Berkeley, CA (US); Himanshu Arora, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 18/123,629

(22) Filed: Mar. 20, 2023

(51) Int. Cl.
*G06V 10/80* (2022.01)
*G06T 3/18* (2024.01)
*G06T 5/77* (2024.01)
*G06T 7/73* (2017.01)
*G06V 10/25* (2022.01)
*G06V 10/44* (2022.01)

(52) U.S. Cl.
CPC .............. *G06V 10/806* (2022.01); *G06T 3/18* (2024.01); *G06T 5/77* (2024.01); *G06T 7/73* (2017.01); *G06V 10/25* (2022.01); *G06V 10/44* (2022.01); *G06T 2207/20081* (2013.01); *G06T 2207/30196* (2013.01)

(58) Field of Classification Search
CPC ...... G06V 10/806; G06V 10/25; G06V 10/44; G06T 3/18; G06T 5/77; G06T 7/73; G06T 2207/20081; G06T 2207/30196
See application file for complete search history.

(56) References Cited

U.S. PATENT DOCUMENTS

2022/0188559 A1* 6/2022 Baek ........................ G06T 7/73
2022/0237945 A1* 7/2022 Ahn ...................... G06V 20/59

OTHER PUBLICATIONS

Aberman et al., "Deep Video-Based Performance Cloning", In Computer Graphics Forum, vol. 38, No. 2, Aug. 21, 2018, pp. 219-233.
Albahar et al., "Pose with Style: Detail-Preserving Pose-Guided Image Synthesis with Conditional StyleGAN", Association for Computing Machinery Transactions on Graphics (TOG), vol. 40, No. 6, Article 218, Dec. 2021, pp. 218:1-218:11.
(Continued)

*Primary Examiner* — Chong Wu
(74) *Attorney, Agent, or Firm* — Kilpatrick Townsend & Stockton LLP

(57) ABSTRACT

Techniques for image generation based on a multi-image set and pose data is described herein. In an example, a computer system generates, by at least using a first machine learning (ML) model, a pose feature based on pose data that indicates a target pose. The computer system generates, by at least using a second ML model, a first appearance feature based on a first image and the pose data. The computer system generates, by at least using the second ML model, a second appearance feature based on a second image and the pose data. The computer system generates a combined appearance feature based on the first appearance feature and the second appearance feature. The computer system generates, by at least using a third ML model, a third image showing an appearance of an element in the target pose based on the pose feature and the combined appearance feature.

20 Claims, 15 Drawing Sheets

(56) References Cited

OTHER PUBLICATIONS

Alldieck et al., "Photorealistic Monocular 3D Reconstruction of Humans Wearing Clothing", In Proceedings of the Institute of Electrical and Electronics Engineers/Computer Vision Foundation Conference on Computer Vision and Pattern Recognition, Apr. 19, 2022, pp. 1-14.

Bi et al., "Deep 3D Capture: Geometry and Reflectance from Sparse Multi-View Images", In Proceedings of the Institute of Electrical and Electronics Engineers/Computer Vision Foundation Conference on Computer Vision and Pattern Recognition, 2020, pp. 5960-5969.

Bogo et al., "Keep it SMPL: Automatic Estimation of 3D Human Pose and Shape from a Single Image", Computer Vision—European Conference on Computer Vision, Oct. 2016, pp. 1-18.

Cao et al., "Realtime Multi-Person 2D Pose Estimation using Part Affinity Fields", Institute of Electrical and Electronics Engineers Conference on Computer Vision and Pattern Recognition (CVPR), Apr. 14, 2017, pp. 1-9.

Duchon , "Splines Minimizing Rotation-Invariant Semi-Norms in Sobolev Spaces", In Constructive Theory of Functions of Several Variables, 1977, pp. 85-100.

Fruhstuck et al., "InsetGAN for Full-body Image Generation", In Proceedings of the Institute of Electrical and Electronics Engineers Conference on Computer Vision and Pattern Recognition, 2022, 16 pages.

Fuentes-Pacheco et al., "Visual Simultaneous Localization and Mapping: A Survey", Artificial Intelligence Review, vol. 43, No. 1, Nov. 2015, pp. 1-32.

Gong et al., "Graphonomy: Universal Human Parsing Via Graph Transfer Learning", In Proceedings of the Institute of Electrical and Electronics Engineers/ Computer Vision Foundation Conference on Computer Vision and Pattern Recognition, Apr. 9, 2019, 10 pages.

Grigorev et al., "Coordinate-based Texture Inpainting for Pose-guided Human Image Generation", In Proceedings of the Institute of Electrical and Electronics Engineers/ Computer Vision Foundation Conference on Computer Vision and Pattern Recognition, Jul. 19, 2019, 10 pages.

Guler et al., "DensePose: Dense Human Pose Estimation in the Wild", In Proceedings of the Institute of Electrical and Electronics Engineers Conference on Computer Vision and Pattern Recognition, 2018, pp. 7297-7306.

Han et al., "Viton: An Image-based Virtual Try-on Network", In Proceedings of the Institute of Electrical and Electronics Engineers Conference on Computer Vision and Pattern Recognition, Jun. 12, 2018, 19 pages.

He et al., "Deep Residual Learning for Image Recognition", In Proceedings of the Institute of Electrical and Electronics Engineers Conference on Computer Vision and Pattern Recognition, Jun. 2016, pp. 770-778.

Heusel et al., "GANs Trained by a Two Time-Scale Update Rule Converge to a Local Nash Equilibrium", Proceedings of the 31st International Conference on Neural Information Processing Systems, Dec. 2017, pp. 1-12.

Kar et al., "Learning a Multi-view Stereo Machine", In Advances in Neural Information Processing Systems, Aug. 17, 2017, pp. 1-13.

Karras et al., "A Style-Based Generator Architecture for Generative Adversarial Networks", In Proceedings of the Institute of Electrical and Electronics Engineers Conference on Computer Vision and Pattern Recognition, Jun. 2019, pp. 4401-4410.

Karras et al., "Analyzing and Improving the Image Quality of StyleGAN", Proceedings of the Institute of Electrical and Electronics Engineers, Conference on Computer Vision and Pattern Recognition, Jun. 14, 2020, pp. 8110-8119.

Kingma et al., "Adam: A Method for Stochastic Optimization", Conference Paper at International Conference on Learning Representations (ICLR), Jan. 30, 2017, pp. 1-15.

Liu et al., "Deepfashion: Powering Robust Clothes Recognition and Retrieval with Rich Annotations", In Proceedings of the Institute of Electrical and Electronics Engineers Conference on Computer Vision and Pattern Recognition, Jun. 27-30, 2016, pp. 1096-1104.

Liu et al., "PoseGAN: A Pose-to-image Translation Framework for Camera Localization", International Society for Photogrammetry and Remote Sensing (ISPRS) Journal of Photogrammetry and Remote Sensing, vol. 166, Aug. 2020, pp. 1-17.

Lombardi et al., "Neural Volumes: Learning Dynamic Renderable Volumes from Images", Association for Computing Machinery Transactions on Graphics, vol. 38, No. 4, Jul. 2019, pp. 1-14.

Ma et al., "Disentangled Person Image Generation", In Proceedings of the Institute of Electrical and Electronics Engineers Conference on Computer Vision and Pattern Recognition, Jun. 15, 2018, pp. 1-17.

Men et al., "Controllable Person Image Synthesis with Attribute-Decomposed GAN", In Proceedings of the Institute of Electrical and Electronics Engineers/Computer Vision Foundation Conference on Computer Vision and Pattern Recognition, Jul. 19, 2020, 10 pages.

Mildenhall et al., "NeRF: Representing Scenes as Neural Radiance Fields for View Synthesis", Communications of The Association for Computing Machinery, vol. 65, No. 1, Aug. 3, 2020, pp. 1-25.

Ozyesil et al., "A Survey of Structure from Motion", Acta Numerica, vol. 26, May 9, 2017, pp. 1-40.

Park et al., "Semantic Image Synthesis with Spatially-Adaptive Normalization", In Proceedings of the Institute of Electrical and Electronics Engineers/Computer Vision Foundation Conference on Computer Vision and Pattern Recognition, Mar. 18, 2019, pp. 2337-2346.

Park et al., "Swapping Autoencoder for Deep Image Manipulation", Advances in Neural Information Processing Systems, vol. 33, Jul. 2020, pp. 1-14.

Ren et al., "Deep Image Spatial Transformation for Person Image Generation", In Proceedings of the Institute of Electrical and Electronics Engineers/Computer Vision Foundation Conference on Computer Vision and Pattern Recognition, Jun. 2020, pp. 7690-7699.

Ronneberger et al., "U-Net: Convolutional Networks for Biomedical Image Segmentation", In International Conference on Medical Image Computing and Computer-Assisted Intervention, May 18, 2015, pp. 1-8.

Saito et al., "PIFu: Pixel-Aligned Implicit Function for High-Resolution Clothed Human Digitization", In Proceedings of the Institute of Electrical and Electronics Engineers/Computer Vision Foundation International Conference on Computer Vision, Dec. 3, 2019, pp. 1-15.

Sarkar et al., "Style and Pose Control for Image Synthesis of Humans from a Single Monocular View", Available online at: https://arxiv.org/pdf/2102.11263, Feb. 22, 2021, pp. 1-15.

Shuai et al., "Novel View Synthesis of Human Interactions from Sparse Multi-view Videos", In The Association for Computing Machinery Special Interest Group on Computer Graphics and Interactive Techniques (SIGGRAPH) 2022 Conference Proceedings, Aug. 7-11, 2022, 10 pages.

Simonyan et al., "Very Deep Convolutional Networks for Large-scale Image Recognition", Available online at: https://arxiv.org/pdf/1409.1556, Apr. 10, 2015, pp. 1-14.

Tatarchenko et al., "Multi-view 3d Models from Single Images with a Convolutional Network", In European Conference on Computer Vision, Aug. 2, 2016, pp. 1-20.

Wang et al., "Toward Characteristic-Preserving Image-based Virtual Try-on Network", In Proceedings of the European Conference on Computer Vision (ECCV), Sep. 12, 2018, pp. 1-16.

Weng et al., "HumanNeRF: Free-viewpoint Rendering of Moving People from Monocular Video", In Proceedings of the Institute of Electrical and Electronics Engineers/Computer Vision Foundation Conference on Computer Vision and Pattern Recognition, 2022, 15 pages.

Xie et al., "Towards Scalable Unpaired Virtual Try-on via Patch-Routed Spatially-Adaptive GAN", Advances in Neural Information Processing Systems, vol. 34, Nov. 20, 2021, pp. 1-12.

(56) References Cited

OTHER PUBLICATIONS

Xiu et al., "ICON: Implicit Clothed Humans Obtained from Normals", In 2022 the Institute of Electrical and Electronics Engineers /Computer Vision Foundation Conference on Computer Vision and Pattern Recognition (CVPR), Jun. 2022, pp. 13296-13306.

Yang et al., "Dense 3d Object Reconstruction from a Single Depth View", the Institute of Electrical and Electronics Engineers Transactions on Pattern Analysis and Machine Intelligence, vol. 41, No. 12, Sep. 2018, pp. 1-14.

Yoon et al., "Pose-guided Human Animation from a Single Image in the Wild", In Proceedings of the Institute of Electrical and Electronics Engineers/ Computer Vision Foundation Conference on Computer Vision and Pattern Recognition, Jun. 2021, pp. 15039-15048.

Yu et al., "pixelNeRF: Neural Radiance Fields from One or Few Images", In Proceedings of the Institute of Electrical and Electronics Engineers/Computer Vision Foundation Conference on Computer Vision and Pattern Recognition, 2021, pp. 4578-4587.

Zhang et al., "The Unreasonable Effectiveness of Deep Features as a Perceptual Metric", In Proceedings of the Institute of Electrical and Electronics Engineers/Computer Vision Foundation Conference on Computer Vision and Pattern Recognition, Jan. 2018, pp. 586-595.

Zhou et al., "View Synthesis by Appearance Flow", In European Conference on Computer Vision, Feb. 11, 2017, pp. 1-16.

\* cited by examiner

IMAGE GENERATION BASED ON A MULTI-IMAGE SET AND POSE DATA

BACKGROUND

Image generation may involve using a given image to synthesize a new image. In some instances, machine learning may be used for image synthesis. For example, the new image may be generated by a machine learning model that receives the given image as an input and produces the new image as an output.

BRIEF DESCRIPTION OF THE DRAWINGS

Various embodiments in accordance with the present disclosure will be described with reference to the drawings, in which.

DETAILED DESCRIPTION

Figure 1:
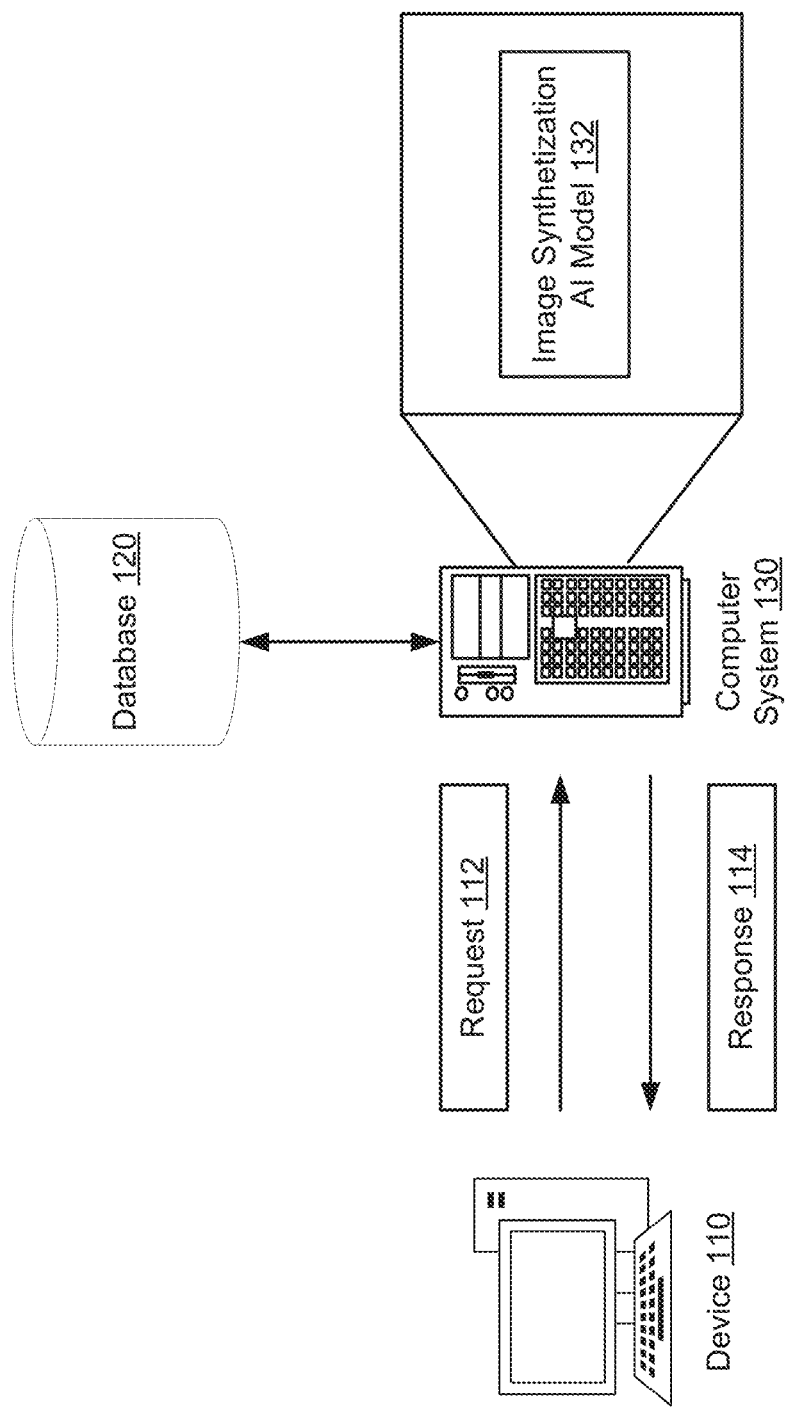
FIG. 1 illustrates an example of a system for image generation based on a multi-image set and pose data, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, image generation based on a multi-image set and pose data. In an example, a computer system generates, by at least using a first machine learning (ML) model, a pose feature based on pose data that indicates a target pose. The target pose can be shown in a target image. The computer system can generate a first appearance feature based on a first image and the pose data. The first image may show a first appearance of a first element (e.g., person, animal, etc. having an object thereon, such as wearing a garment) in a first pose. The computer system can also generate a second appearance feature based on a second image and the pose data. The second image may show a second appearance of the element in a second pose. The first appearance feature and the second appearance feature may be generated by a second ML model. The computer system can then generate a combined appearance feature based on the first appearance feature and the second appearance feature. A third image may then be generated showing an appearance of an element in the target pose based on the pose feature and the combined appearance feature. A third ML model may generate the third image. As such, multiple images showing various appearances of an element in different poses can be used to generate an image of the element in a target pose.

To illustrate, consider an online marketplace that provides items to users. A user may access the online marketplace using a user device to browse items that are available. As an example, the user may browse clothing garments. The user may select a shirt and view images provided of the shirt by the online marketplace. However, the user may wish to see a particular pose of the shirt being worn by a first person, which may not be available from the online marketplace. So, the user device can send a request to a computer system indicating a target pose of a second person to be shown in an image, where the shirt should be shown in the image. The second person can be the same as the first person, the user, or some other person. The computer system can process various reference images of the shirt along with the target pose to generate the image that shows the shirt in the target pose. Processing the reference images and the target pose may involve various ML models that generate a pose feature of the target pose, appearance features of the shirt in the reference images, and the image based on the pose feature and the appearance features. The image can then be sent to the user device and displayed to the user.

Embodiments of the present disclosure may provide technical improvements over conventional techniques for photorealistic human image synthesis. For most human image synthesis applications, reference images are needed to guide the target human pose and appearance (e.g., including face, skin, and garment appearances). Human image synthesis may be challenging since the human body consists of several articulated parts. Thus, it is nontrivial to synthesize a human image that accurately represents the 3D structure of individual body parts as well as the holistic relationships among them. In other words, accurately incorporating the geometry and part relationships is important for the realism of a synthesized human image. In addition, realistic garments are hard to synthesize. As non-rigid objects, the garments may fold and their texture may alter differently on different part of the human body.

Conventional techniques often take a single-view reference image as input, which may be able to successfully synthesize human images when the view change from the reference to the target is not drastic. Even when garment warping is used, the quality suffers with drastic view changes due to occlusions and limited visible regions from a single view. Other conventional techniques may reconstruct 3D models from multi-view person images and use these models to render human images from novel viewpoints. These approaches may provide high-quality human body shape reconstruction. However, they are not able to generate the texture maps accurately due to the difficulty of registration among different views. Embodiments of the present disclosure are able to directly synthesize human images to enhance textural quality and photorealism.

Embodiments of the present disclosure alleviate the aforementioned challenges by learning from multi-view reference images. Synthesizing images from multi-view inputs may be advantageous since multi-view human images are common, easy to obtain and readily available, which provides large-scale readily-available images for designing multi-view human image synthesis systems. Additionally, geometric and holistic structures of a human body can be better parsed, represented, and synthesized from multi-view input images. Moreover, the whole garment is never visible from a single view. Also, for many poses, different body parts occlude garments. So, using multiple views provides additional observations which enable the reconstruction of the entire texture of the garment in high fidelity. Reference images are mapped in both a UV space and a pixel space to take advantage of the benefits of both approaches to improve the rendering quality of the human skin as well as the garment textures. A conditional patch loss is also introduced to improve the fidelity and details of the generated images.

FIG. 1 illustrates an example of a system for image generation based on a multi-image set and pose data, according to an embodiment of the present disclosure. As illustrated in FIG. 1, a device 110, which presents a graphical user interface (GUI), sends a request 112 to a computer system 130. In FIG. 1, the device 110 is illustrated as a desktop computer. Of course, the embodiments of the present disclosure similarly apply to other type of user devices including laptop computers, smartphones, etc. The request 112 may be a repose request or a try-on request. The request 112 can be associated with an item, such as a garment, such that a repose request is associated with requesting the garment to be shown in a particular pose and a try-on request is associated with requesting the garment to be shown on a particular element (e.g., a person, an animal, etc.).

In the interest of clarity of explanation, various embodiments are described in connection with a person and clothing articles (e.g., at least a shirt). However, the embodiments are not limited as such. Instead, the embodiments similarly and equivalently apply to any element that can have an appearance. The element can be a person, a pet, or any other type of living being or even a non-living being (e.g., a statute, a mannequin, etc.). The appearance may be due to an object that can be associated with the element (e.g., an article of clothing, a paint, etc.). Generally, the embodiments enable the generation of an image showing an element in a different pose than a set of input poses shown in images, where these images can also show the same element or a different element in different appearances according to the input poses.

In an example, the request 112 may be a repose request for a garment (e.g., a shirt) worn by an element (e.g., a person). The request 112 may include data that indicates an image that shows the person in a target pose along with a repose request to the target pose. A shirt being worn in the image can be different from the shirt associated with the request 112. The computer system 130 can include an image synthetization artificial intelligence (AI) model 132 for generating an image of the requested shirt in the target pose. To do so, the computer system 130 can access a database 120 of images. The computer system 130 can receive images from the database 120 that show the requested shirt on a person in various poses. Based on the target pose indicated in the request 112, the computer system 130 can generate pose data that indicates the target pose and a first machine learning model of the image synthetization AI model 132 generates a pose feature based on the pose data. A second machine learning model of the image synthetization AI model 132 can generate appearance features corresponding to the requested shirt. The appearance feature of each image can be generated based on the pose data. The appearance features can be combined into a combined appearance feature and then a third machine learning model of the image synthetization AI model 132 can generate an image showing the requested shirt, or a portion of the shirt, in the target pose. The computer system 130 can send a response 114 that includes the image of the requested shirt in the target pose to the device 110.

In another example, the request 112 may be a try-on request for a garment (e.g., a shirt) worn by an element (e.g., a person). The request 112 may include data that indicates an image that shows a shirt of a person in a target pose along with a try-on request of the shirt. The computer system 130 can generate an image of the shirt on the person in the target pose. To do so, the computer system 130 can access the database 120 of images. The computer system 130 can receive images from the database 120 that show the shirt on a person in various poses. The person in the image of the request 112 can be different from the person(s) in the images from the database 120. Based on the target pose indicated in the request 112, the computer system 130 can generate pose data that indicates the target pose and the first machine learning model of the image synthetization AI model 132 generates a pose feature based on the pose data. The second machine learning model of the image synthetization AI model 132 can generate appearance features corresponding to the shirt. The appearance feature of each image can be generated based on the pose data. The appearance features can be combined into a combined appearance feature and then the third machine learning model of the image synthetization AI model 132 can generate an image showing the shirt on the person in the target pose. The computer system 130 can send the response 114 that includes the image of the shirt, or a portion of the shirt, on the person in the target pose to the device 110.

In some instances, the computer system 130 may determine that the database 120 already stores an image that corresponds to a result of the image synthetization AI model 132 processing the request 112. So, the response 114 from the computer system 130 can include a link to the image stored in the database 120 rather than the image itself.

Figure 2:
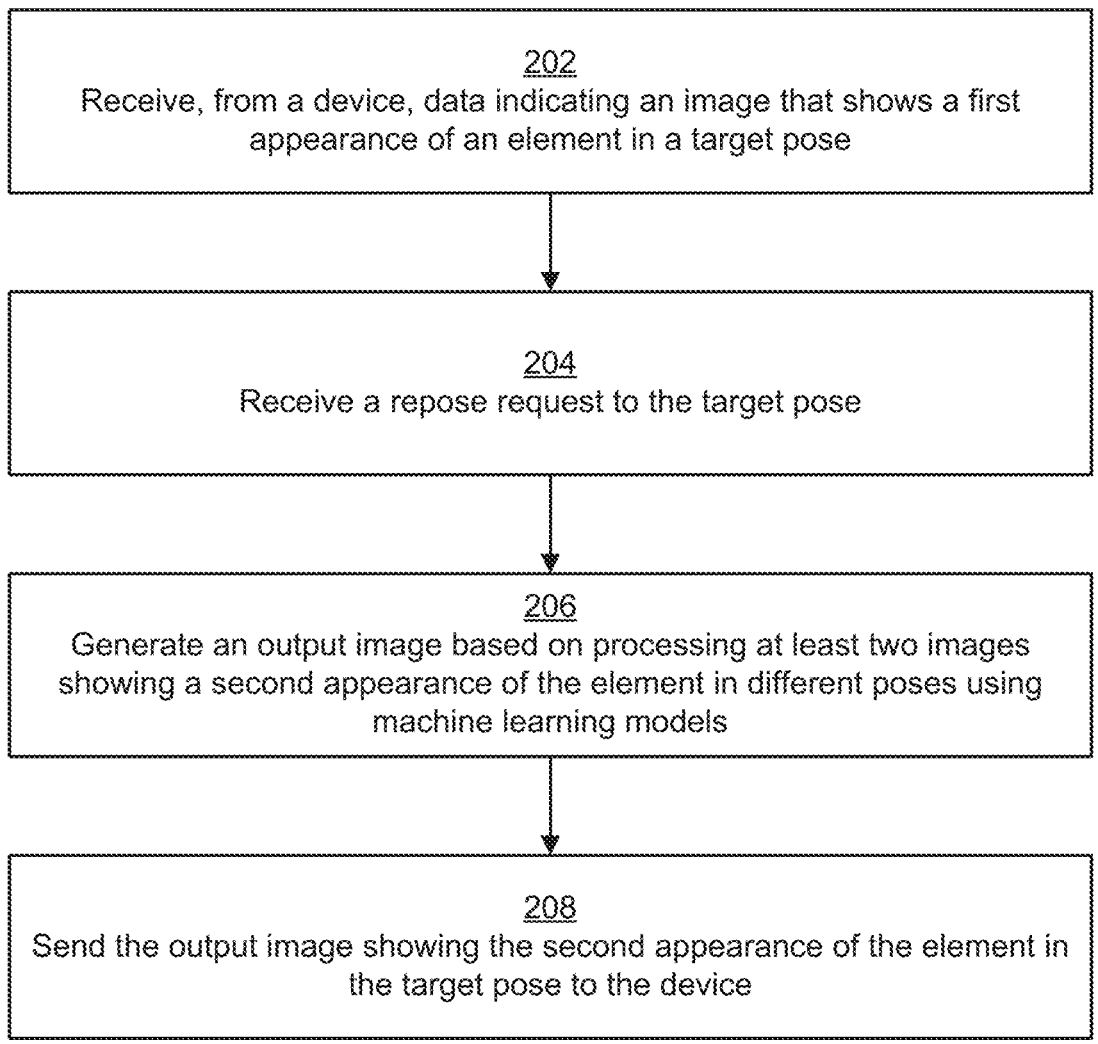
FIG. 2 illustrates an example of a flow for an overall process of reposing an appearance of an element, according to an embodiment of the present disclosure.
Figure 3:
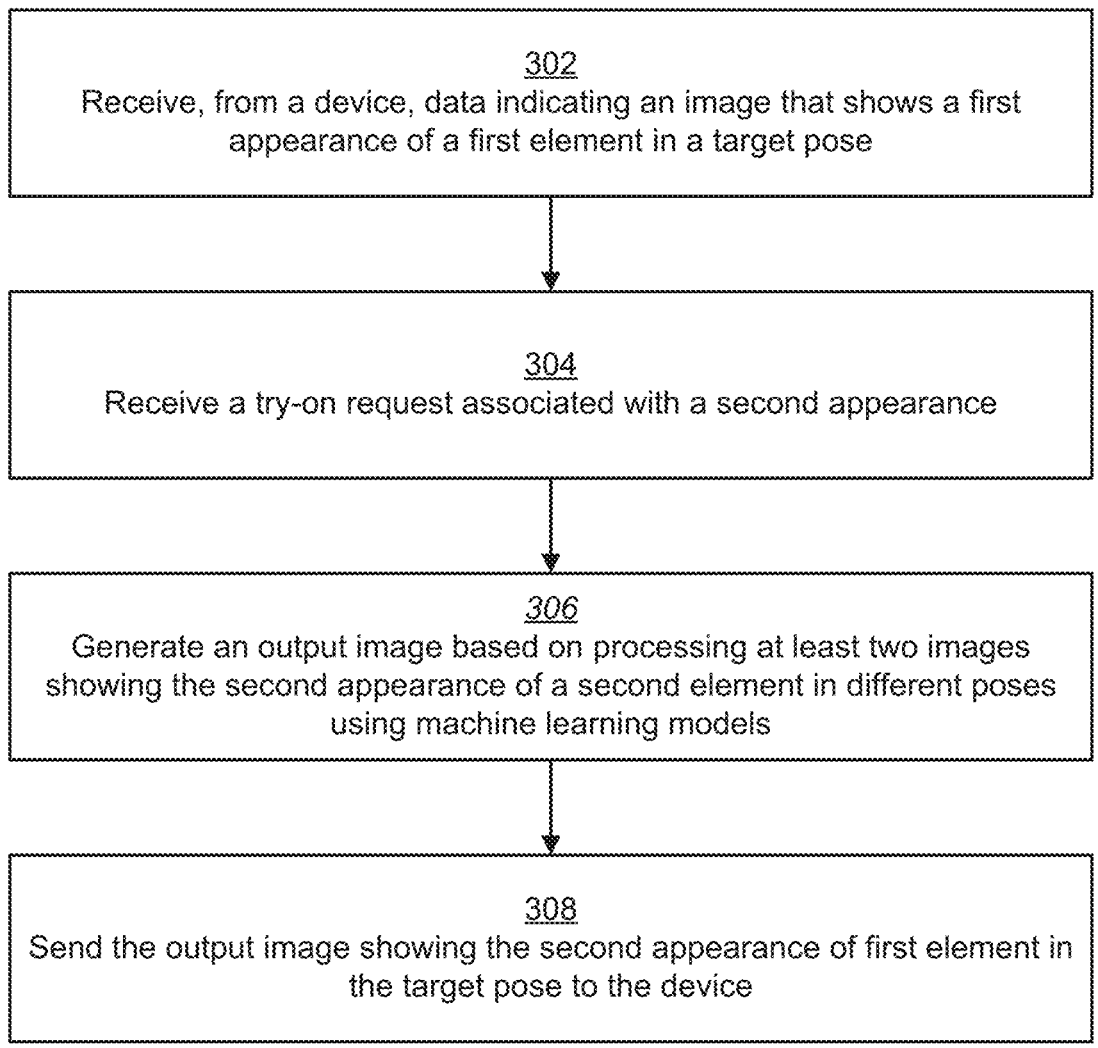
FIG. 3 illustrates an example of a flow for an overall process of trying on a garment on an element, according to an embodiment of the present disclosure.

FIGS. 2-3 illustrate processes associated with image generation for reposing and try-on, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 2 illustrates an example of a flow for an overall process of reposing an appearance of an element, according to an embodiment of the present disclosure. In an example, the flow includes operation 202, where the computer system receives, from a device, data indicating an image that shows a first appearance of an element in a target pose. For instance, the image may show a person wearing a first pair of shorts from the back. So, the first appearance of the first element is the first pair of shorts being worn by a person, and the target pose is a back view.

In an example, the flow includes operation 204, where the computer system receives a repose request to the target pose. The repose request may be associated with a second pair of shorts, meaning that the computer system is being requested to generate an image that shows the second pair of shorts from the back.

In an example, the flow includes operation 206, where the computer system generates an output image based on processing at least two images showing a second appearance of a second element in different poses using machine learning models. For instance, the images may include a first image that shows the person wearing the second pair of shorts from the front and a second image that shows the person wearing the second pair of shorts from the side. Other images of the second pair of shorts being worn by the person in other poses are also possible. The machine learning models may include a first machine learning model that generates a pose feature based on pose data that indicates the target pose. The machine learning models may also include a second machine learning model that generates a first appearance feature based on the first image and the pose data and a second appearance feature based on the second image and the pose data. The first appearance feature and the second appearance feature can be combined into a combined appearance feature. The machine learning models may also include a third machine learning model that generates the output image based on the pose feature and a combined appearance feature of the first appearance feature and the second appearance feature. The output image shows the second pair of shorts on the person from the back (in the target pose).

In an example, the flow includes operation 208, where the computer system sends the output image showing the second appearance of the element (e.g., (e.g., the second pair of shorts being worn by the person) in the target pose (e.g., from the back) to the device. The computer system may alternatively save the output image in a database and send a link to the output image in the database to the device.

FIG. 3 illustrates an example of a flow for an overall process of trying on a garment on an element, according to an embodiment of the present disclosure. In an example, the flow includes operation 302, where the computer system receives, from a device, data indicating an image that shows a first appearance of a first element in a target pose. For instance, the image may show a first person wearing a first jacket from the front with their arms crossed. So, the first appearance of the first element is the first jacket being worn by a first person, and the target pose is from the front with crossed arms.

In an example, the flow includes operation 304, where the computer system receives a try-on request associated with a second appearance. For instance, the try-on request may be associated with a second jacket, meaning that the computer system is being requested to generate an image that shows the first person wearing the second jacket from the front with their arms crossed.

In an example, the flow includes operation 306, where the computer system generates an output image based on processing at least two images showing the second appearance of a second element in different poses using machine learning models. For instance, the images may include a first image that shows a second person wearing the second jacket from the front and a second image that shows the second person wearing the second jacket from the side. Other images of the second jacket being worn by the second person in other poses are also possible. The machine learning models may include a first machine learning model that generates a pose feature based on pose data that indicates the target pose. The machine learning models may also include a second machine learning model that generates a first appearance feature based on the first image and the pose data and a second appearance feature based on the second image and the pose data. The first appearance feature and the second appearance feature can be combined into a combined appearance feature. The machine learning models may also include a third machine learning model that generates the output image based on the pose feature and a combined appearance feature of the first appearance feature and the second appearance feature. The output image shows the second jacket on the first person from the front with their arms crossed (in the target pose).

In an example, the flow includes operation 308, where the computer system sends the output image showing the second appearance of the first element (e.g., the second jacket being worn by the first person) in the target pose (e.g., from the front with their arms crossed) to the device. The computer system may alternatively save the output image in a database and send a link to the output image in the database to the device.

Figure 4:
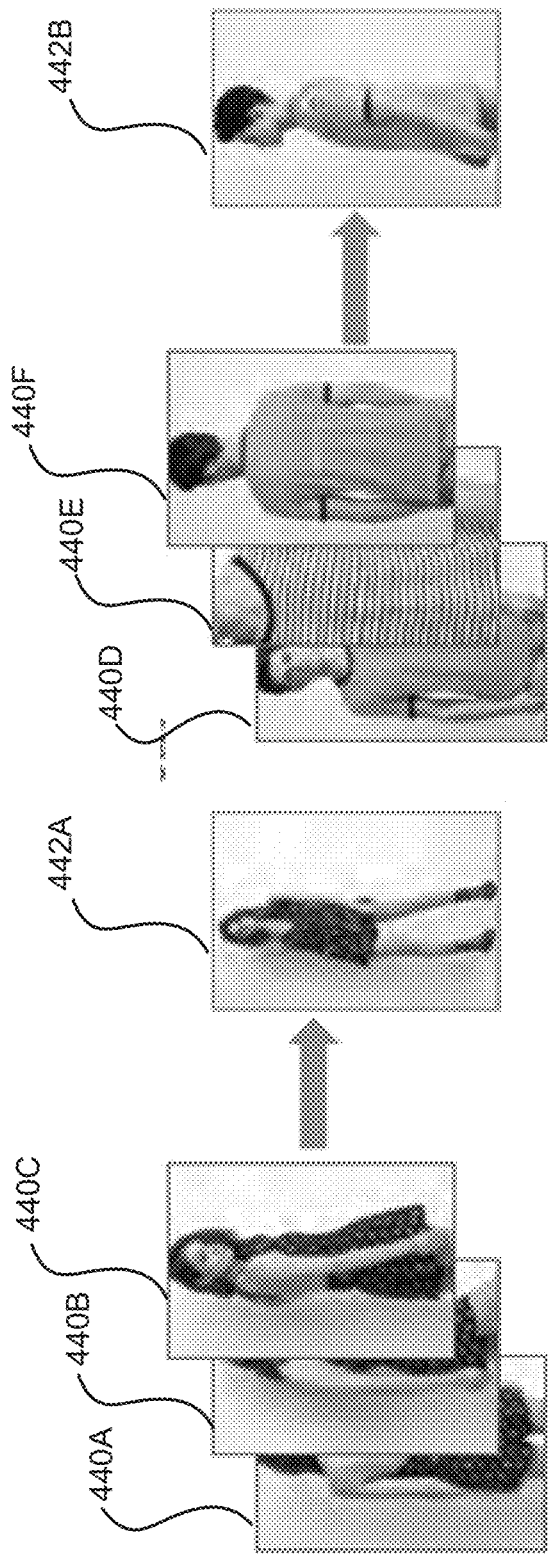
FIG. 4 illustrates image generation for reposing using multi-view images, according to an embodiment of the present disclosure.

FIG. 4 illustrates image generation for reposing using multi-view images, according to an embodiment of the present disclosure. Output images 442A-B are generated from various input images 440A-F. Output image 442A shows a female person in a dress from the front, meaning that the target of the output image 442A was to show the female person in the dress from the front. As can be seen from input images 440A-C, images showing the female person in the dress from the side and the back can be used to generate the output image 442A. An image synthetization AI model, such as the image synthetization AI model 132 in FIG. 1, can receive the input images 440A-C and an indication of the target pose and generate the output image 442A, which is a reposed version of the dress and person in the input images 442A-C.

In addition, output image 442B shows a male person in a striped shirt from the left side, meaning that the target of the output image 442B was to show the male person in the striped shirt from the left side. As can be seen from input images 440D-F, images showing the male person in the striped shirt from the front zoomed-in and zoomed-out and from the back can be used to generate the output image 442B. The image synthetization AI model can receive the input images 440D-F and an indication of the target pose and generate the output image 442B, which is a reposed version of the striped shirt and person in the input images 442D-F.

Generating the output images 442A-B from multi-view input images may present several advantages. A first advantage may be that multi-view human images are common, easy to obtain and readily available. For example, in the fashion industry, it may be common to shoot a certain garment from multiple views for an improved visualization experience. This provides large-scale readily-available images for designing multi-view human image synthesis systems. Another advantage is that the geometric and holistic structures of a human body can be better parsed, represented, and synthesized from multi-view input images. In addition, since the whole garment may never be visible from a single view, and, for many poses, different body parts occlude garments. So, using multiple views provides additional observations which enable the reconstruction of the entire texture of the garment in high fidelity.

Figure 5:
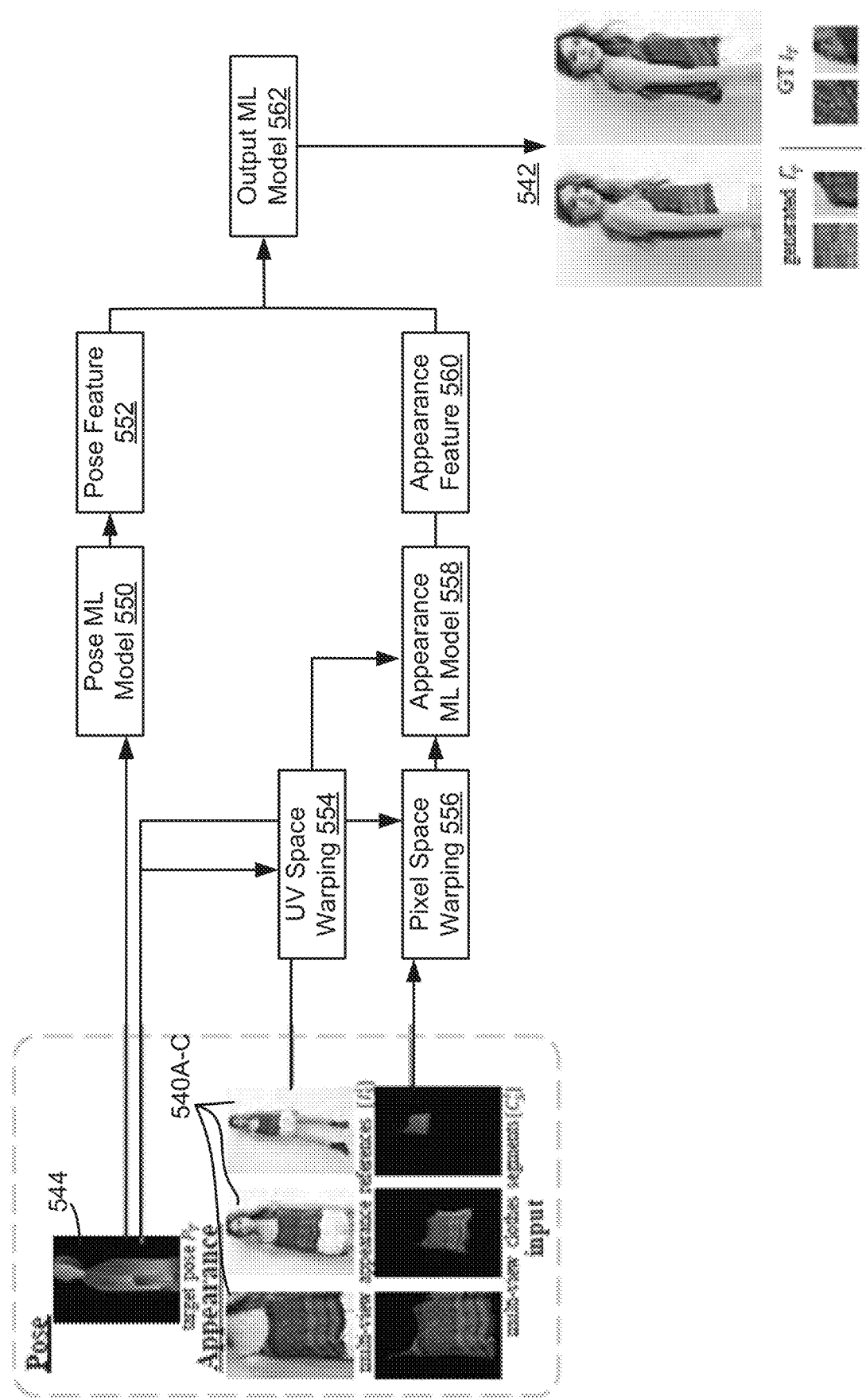
FIG. 5 illustrates an example architecture for image generation from multi-view images, according to an embodiment of the present disclosure.

FIG. 5 illustrates an example architecture for image generation from multi-view images, according to an embodiment of the present disclosure. The architecture can correspond to the image synthetization AI model 132 in FIG. 1. In general, two references are fed to the network for image synthesis: a target pose 544 ($P_T$) and input images 540A-C ($\{I_S^i\}$). The input images 540A-C are warped to the target pose 544, processed by an appearance machine learning (ML) model 558, and fused to generate an appearance feature 560 ($f_A$). The target pose 544 is processed by a pose ML model 550 to generate a pose feature 552 ($f_P$). An output ML model 562 takes both the pose feature 552 and the appearance feature 560 to generate an output image 542. Each component of the framework is described in more detail herein below.

In an example, pose data can be generated from an image that shows the target pose 544. The pose data be input to the pose ML model 550 that is trained to encode the pose data into the pose feature 552.

Figure 6:
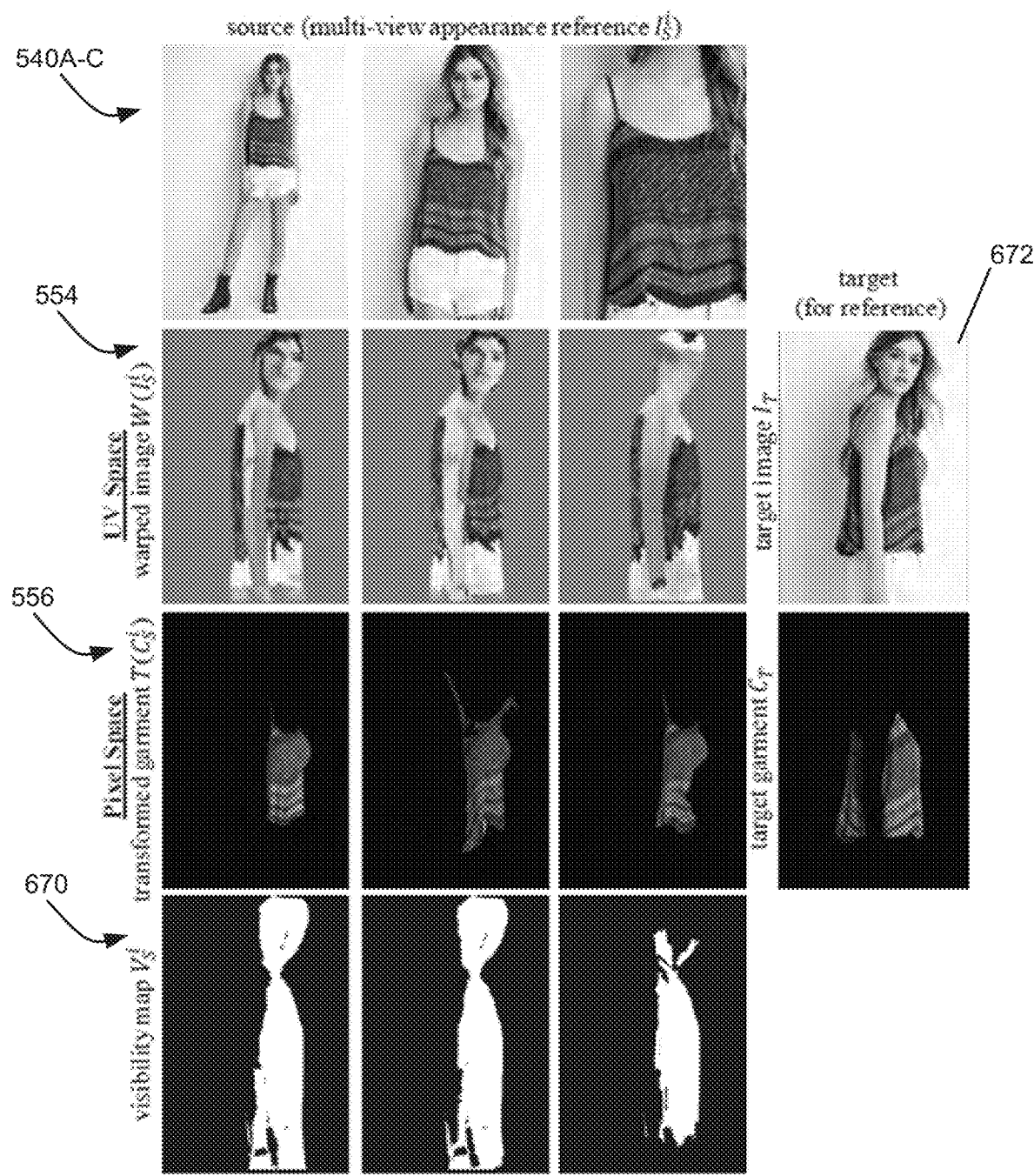
FIG. 6 illustrates an example of image warping in a UV space and a pixel space, according to an embodiment of the present disclosure.
Figure 7:
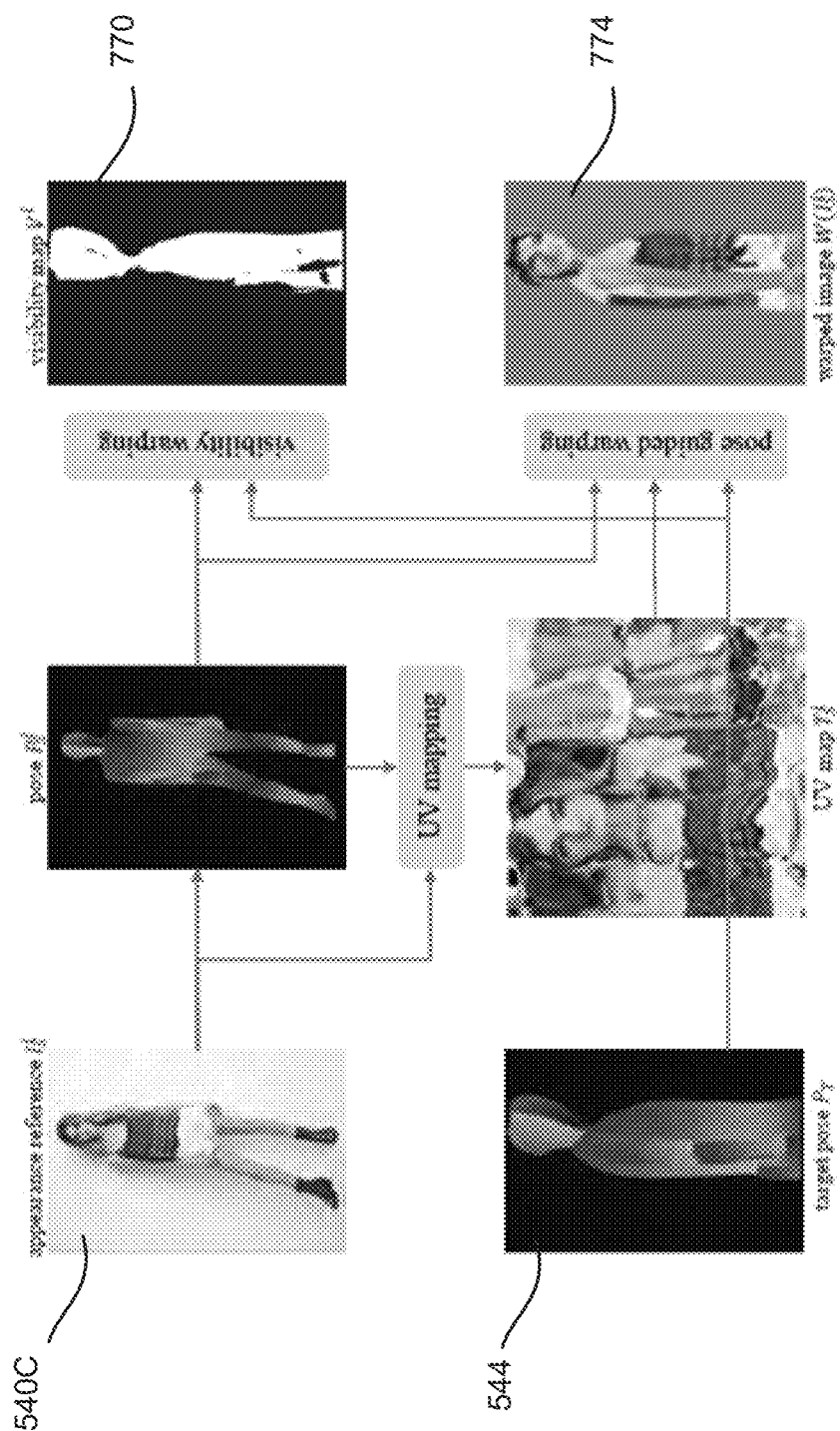
FIG. 7 illustrates an example image warping in a UV space according to an embodiment of the present disclosure.
Figure 8:
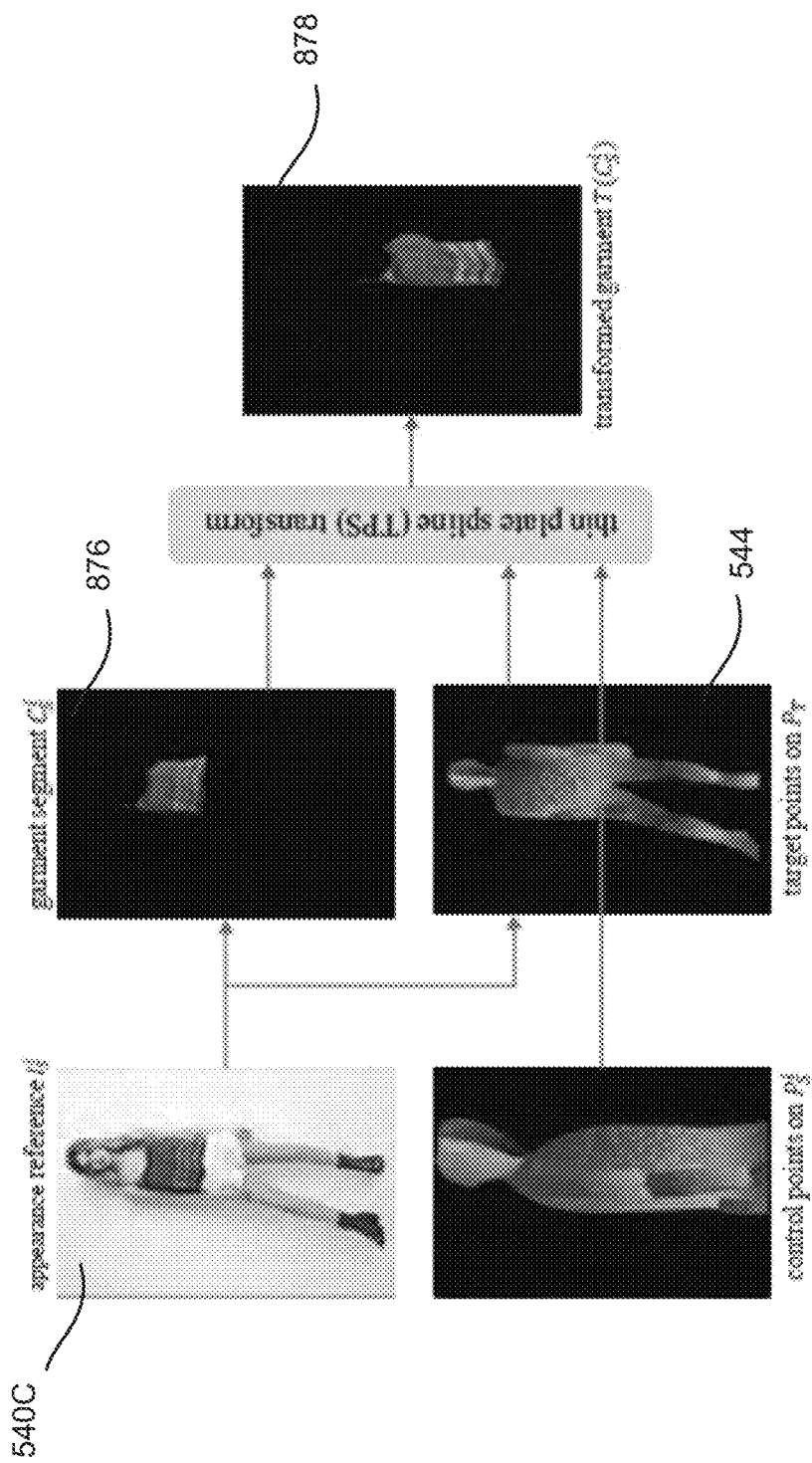
FIG. 8 illustrates an example of image warping in a pixel space, according to an embodiment of the present disclosure.

In an example, each input image 540A-C can be warped before being input to the appearance ML model 558 to generate the appearance feature 560. Warping the input images 540A-C is further illustrated in FIGS. 6-8. Warping an input image can involve UV space warping 554 that generates a first warped image (e.g., warped image 774 in FIG. 7) by warping the input image in a UV space based on a pose of the input image and a target pose shown in a target image (e.g., target image 672 in FIG. 6). The warping can also involve pixel space warping 556 that generates a second warped image by warping a garment image (e.g., garment image 876 in FIG. 8) in a pixel space based on the pose in the input image and the target pose 544. The garment image 876 showing the garment in the pose can be generated by determining a garment shown in the input image 540C as part of an appearance of a person in the input image 540C. A number of points shown in the input image 540C and the target image showing the target pose 544 and common to the pose of the input image 540C and the target pose 544 can be determined to exceed a threshold number. Then the garment image 876 may be warped based on the pose data to generate another warped image (e.g., warped image 878 in FIG. 8). The appearance feature for the input image is generated by using the first warped image and the second warped image as input to the appearance ML model 558, which outputs an encoding of the first warped image and the second warped image. The feature appearances for the input images 540A-C can be fused into the appearance feature 560 based on a determined weight associated with each appearance feature (e.g., an appearance feature for input image 540A, an appearance feature for input image 540B, and an appearance feature for input image 540C.

A visibility map may additionally be used to generate the appearance feature for each of the input images 540A-C. The pose of an input image can be determined from the input image and the target pose 544 can be determined based on a target image that shows the target pose 544. The visibility map is determined based on the pose and the target pose, where the visibility map indicates a region in the target image that is also available in the input image. The weights associated with each appearance feature can be determined based on the visibility map. For instance, an input to another ML model may be generated based on the visibility map and the warped image, and the other ML model can output an indication of the weights. The appearance feature for an input image may be generated based on the visibility map by determining that a second region in the warped image is unavailable from the input image. The second region can be inpainted in the warped image and the warped image and an indication of the inpainting of the second region can be input to the appearance ML model 558.

In an example, the pose feature 552 and the appearance feature 560 can be input to the output ML model 562, which generates the output image 542. The output ML model 562 may be a decoder that determines a scaling factor and a bias factor based on the appearance feature 560 and generates the output image 542 based on the scaling factor and the bias factor. The scaling factor and the bias factor may be used to modulate the pose feature 552.

The output ML model 562 may be trained using a conditional patch discriminator such that the output ML model 562 is trained to distinguish between an actual patch from an image and a synthesized patch. The output ML model 562 may further be trained based on a distance minimization between a generated image and a ground truth image in at least one of a pixel space or a feature space.

A particular example of the architecture is described herein below, but other architectures are possible. To begin, consider a case where only a single input image $I_S$ exists. The input image $I_S$ and the target image $I_T$ to be synthesized can have different human poses, which are denoted by $P_S$ and $P_T$, respectively. To improve the quality and realism of the synthesized image, the input image $I_S$ and garments $C_S$ can be warped so that their human pose matches with the target pose.

In an example with N multi-view input images $\{I_S^i\}_{i=1,2,...N}$ are used as inputs. For the $i^{th}$ view, the human pose $P_S^i$ is estimated from the input images $I_S^i$. Firstly, based on the correspondence between the input and target poses $P_S^i$, $P_T$, a visibility map $V^i$, which indicates the regions in the target image that is also available in the $i^{th}$ input image. Additionally, the input image $I_S^i$ is warped as $W(i_S^i)$ to match the target pose, and the source garment $C_S^i$ is also warped as $T(C_S^i)$. All N images are encoded as features and fused for image synthesis.

Warping in the UV space involves warping the input image $I_S^i$ of the $i^{th}$ view to match the target pose $P_T$. The UV map of a human pose $P_S^i$ from the source view i makes it possible to obtain pose-agnostic 3D-human-body-shape-aware UV texture map. The texture map may be missing the regions that are not available in $I_S^i$ due to occlusion. Missing regions can be inpainted to obtain the full human texture map $T_S^i$. Further, a confidence map may be used to help the network better understand which regions in the warped image are inpainted and which regions are derived directly from the input image. Specifically, based on the correspondence between the source pose $P_S^i$ and the target pose $P_T$, the visibility map $V^i$ is computed, which is used in multi-view fusion. Since the target pose $P_T$ is also used as input, corresponding pixels can then be mapped to the target pose from the texture map $T_S^i$ to obtain the warped image $W(I_S^i)$.

Garments are warped from the $i^{th}$ source pose $P_S^i$ to the target pose $P_T$ to provide additional guidance for the network to synthesize the target garments. A DensePose-based garment deformation method can perform well with drastic view changes for the input images. This method can handle human poses from any viewpoint and is aware of the 3D shape of the human body.

For a source appearance image $I_S^i$ of the $i^{th}$ view, an upper body garment and a lower body garment are segmented with an off-the-shelf clothed human image segmentation algorithm. The upper and lower body garments go through the same procedure for deforming to the target pose. To guide the garment deformation, corresponding points on the image pose $P_S^i$ and the target pose $P_T$ are found. For this, a grid of points in the UV space of source and target poses $P_S^i$, $P_T^i$, are found. Each point in the grid has two values for $\{u, v\}$ and the corresponding pixel coordinate values $\{x, y\}$. Grid points on $P_T$, $P_S$ that share the same UV values refer to the same locations in the 3D human body defined by Dense-Pose. Due to occlusion, only visible grid points are mapped to 2D pixel space. J points that are available in both source and target images are thus found and considered as correspondences. Such coordinates are denoted on the input image as control points $Q_S^i = \{x_s^{ij}, y_s^{ij}\}_{i=1 \ldots J}$, and corresponding coordinates on the target image as target points $Q_T^i = \{x_T^{ij}, y_T^{ij}\}_{j=1 \ldots J}$.

If there is a drastic change between the image pose and the target pose (e.g., front and back), the garments may not be deformed and only UV warping results may be used to guide the synthesis. When the number of control points J is larger than 30 (or another threshold), thin plate spline (TPS) transformation may be used for garment deformation. Specifically, TPS transforms source garment $C_S^i$ to the target pose using the source control points $Q_S$ and corresponding target points $Q_T$.

To encode images to features, N images $\{I_S^i\}_{i=1, 2, \ldots N}$ are taken as inputs. After warping, warped images $\{W(I_S^i)\}$ and garments $\{T(C_S^i)\}$, which are then encoded to multi-scale features following using the appearance ML model 558. Specifically, at layer l, the pose feature $^l f_P$ is a convolutional feature of target pose $\Gamma_T$, while the appearance feature of the $i^{th}$ view $^l f_P$ is a concatenated feature of the warped image $W(I_S^i)$ and garment $T(C_S^i)$.

All appearance features $\{^l f_A^i\}$ from N input views by weighted averaging. The visibility map $V^i$ is a binary mask indicating the common regions between the $i^{th}$ source pose and the target pose. Two 3×3 convolutions separated by a ReLU activation function are used to transform the concatenated visibility map $V^i$ and warped image $W(I_S^i)$ to a learned single-channel confidence map $U^i$. $U^i$ is then normalized to $U^{i\prime} = \{u^{i\prime}_{x,y}\}$, such that the sum of the N views of each pixel location $u^{i\prime}_{x,y}$ is equal to 1. That is, $$\sum_i^N u^{i\prime}_{x,y} = 1.$$

At each layer l, $U^{i\prime}$ is resized to $^l U^{i\prime}$, which has the same spatial size as the appearance feature map $^l f_A$. The fused appearance feature $^l f_A$ is then a sum of the products of each of the N view-dependent appearance feature maps $^l f_A^i$ with their corresponding weight $U^{i\prime}$ at each pixel location:

$$^l f_A = \sum_i^{N} {}^l U^{i\prime} \circ {}^l f_A^i \qquad (1)$$

where $\circ$ refers to the element-wise product for matrices.

StyleGAN2 blocks with spatial modulation to can be used as the output ML model 562 to decode multi-scale features to images. Spatial modulation can be used to preserve spatial structures of appearance feature $f_A$. Specifically, at layer l, the scaling $\alpha$ and bias $\beta$ are generated with 1×1 convolutions from appearance features $^l f_A$. Pose feature is then modulated as $^l f_P' = \alpha ^l f_P + \beta$, and normalized as $$^l f_P'' = \frac{^l f_P' - \text{mean}(^l f_P')}{std(^l f_P')}.$$

The output ML model 562 may be a conditional patch discriminator $D_{patch}$ that enforces the realism of patches and the similarity of patches in the input image. Given image patches of an input image patch($I_S$) (whose view is randomly selected), the discriminator is asked to distinguish between image patches from the generated image patch($\hat{I}_T$) and those from the ground truth $I_T$. The corresponding patch loss for the discriminator is calculated as:

$$L_{patch} = \mathbb{E}[\log(D_{patch}(\text{patch}(\hat{I}_T), \text{patch}(I_T)|\text{patch}(I_S)))] \qquad (2)$$

where $D_{patch}$ refers to KL-divergence that measures the distance between the generated and ground-truth patches. Empirically, the conditional patch loss may show improved performance compared to unconditional patch loss $\mathbb{E}[-\log (D_{patch}(\text{patch}(\hat{I}_T), \text{patch}(I_T)))$.

In addition to the patch loss $L_{patch}$, the full image adversarial $L_{GAN}$ used in StyleGAN2, and the face identify loss $L_{face}$ used in PWS, the $\mathcal{L}_1$ distance between the generated image $\hat{I}_T$ and the ground-truth $I_T$ is also minimized in both pixel and feature space:

$$L_{rec} = \|\hat{I}_T - I_T\|_1 + \sum_{l=1}^{k} \|\phi_l(\hat{I}_T) - \phi_l(I_T)\|_1 \qquad (3)$$

where k=5, $\phi_T$ denotes the $l^{th}$ feature map in a VGG-19 pretrained on ImageNet. In an example, five feature maps may be used. Therefore, $L_{rec}$ minimizes the differences between the generated image and the ground truth in terms of both pixel appearance and pre-trained features.

Another training loss is a combination of the above-mentioned loss functions:

$$L = L_{GAN} + \lambda_1 L_{rec} + \lambda_2 L_{face} + \lambda_3 L_{patch}, \qquad (4)$$

where $\lambda_1 = 5$, $\lambda_2 = 1$, and $\lambda_3 = 1$.

FIGS. 9-14 illustrate processes associated with image generation from multi-view images, according to an embodiment of the present disclosure. Some or all of the processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 9:
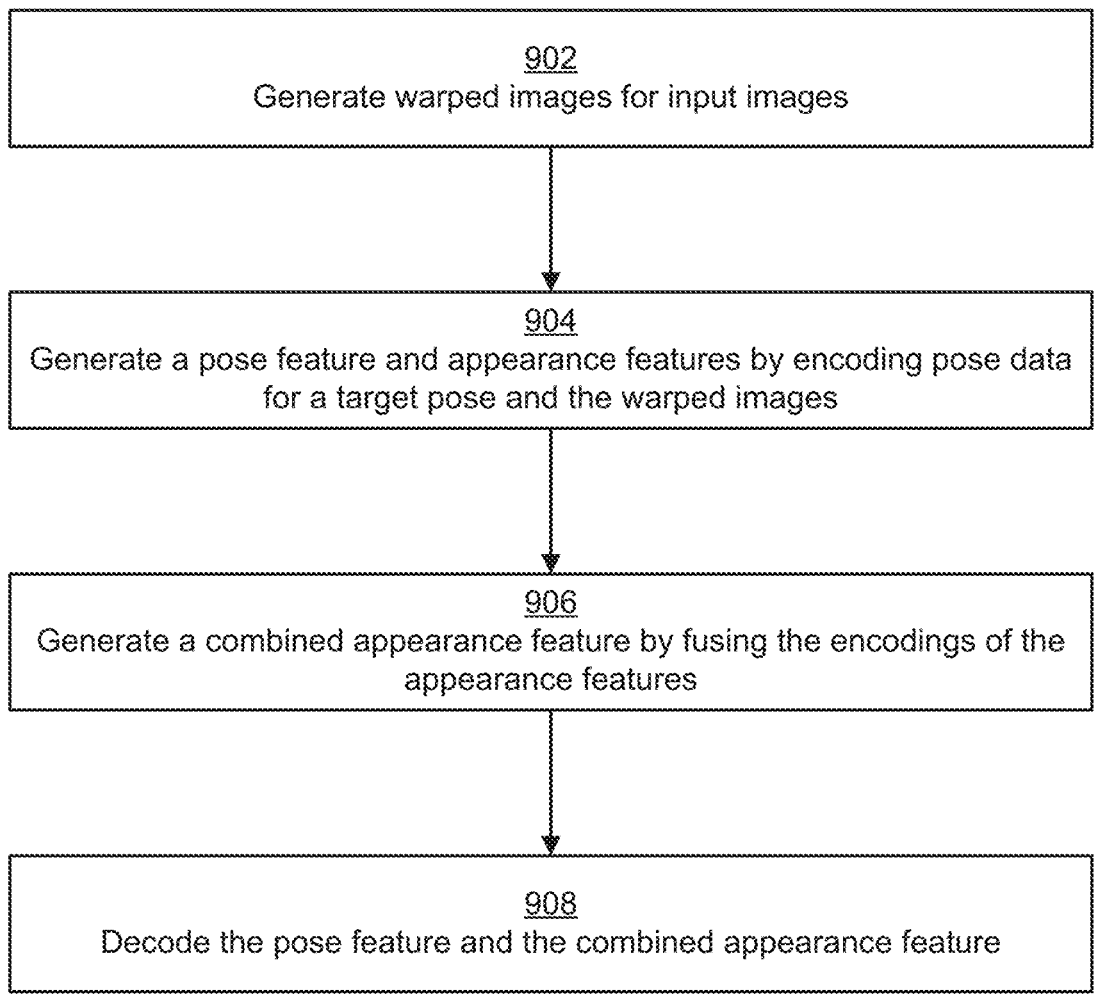
FIG. 9 illustrates an example of a flow for an overall process of generating an image from input images of various views, according to an embodiment of the present disclosure.

FIG. 9 illustrates an example of a flow for an overall process of generating an image from input images of various views, according to an embodiment of the present disclosure. In an example, the flow includes operation 902, where the computer system generates warped images for input images. The input images can show appearances of an element in various poses. The warping may involve UV space warping 554 and pixel space warping 556 in FIG. 5. Warping the images may involve generating a first warped image, determining a visibility map, generating a garment image, and generating a second warped image, as further described in FIG. 10.

In an example, the flow includes operation 904, where the computer system generates a pose feature and appearance features by encoding pose data for a target pose and the warped images. The pose ML model 550 in FIG. 5 and the appearance ML model 558 in FIG. 5 may generate the pose feature and the appearance features, respectively. The encoding is further described in FIG. 11.

In an example, the flow includes operation 906, where the computer system generates a combined appearance feature by fusing the encodings of the appearance features. The fusing is further described in FIG. 12.

In an example, the flow includes operation 908, where the computer system decodes the pose feature and the combined appearance feature. The decoding can be performed by output ML model 562 in FIG. 5. The decoding is further described in FIG. 13.

Figure 10:
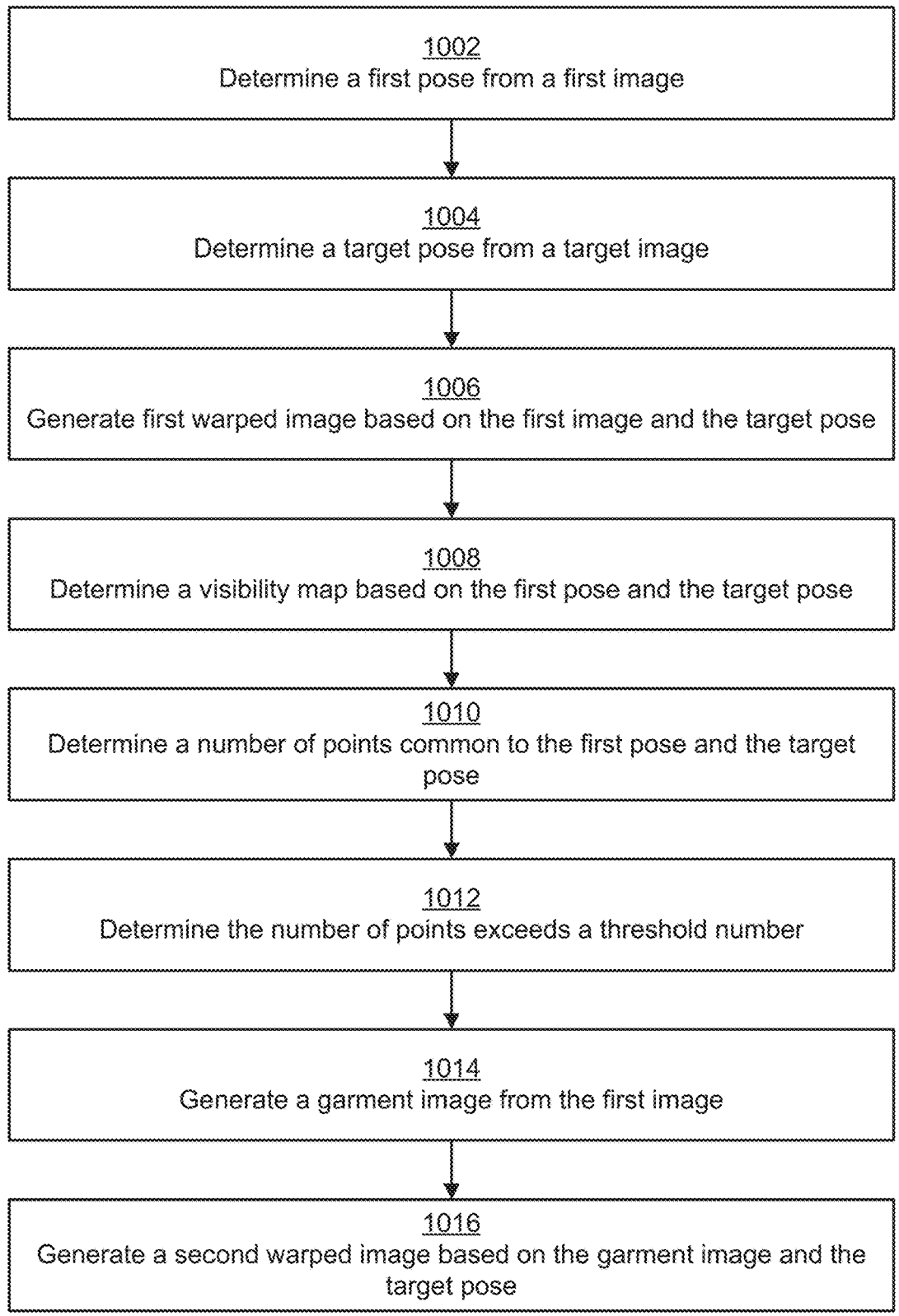
FIG. 10 illustrates an example of a flow for warping an input image, according to an embodiment of the present disclosure.

FIG. 10 illustrates an example of a flow for warping an input image, according to an embodiment of the present disclosure. In an example, the flow includes operation 1002, where the computer system determines a first pose from a first image. The first image may be input to an ML model (e.g., DensePose), which can output pose data of the first pose. Examples of poses include front upper body, front full body, left side view, right side view, back upper body, back lower body, etc.

In an example, the flow includes operation 1004, where the computer system determines a target pose from a target image. Target pose data may be generated from the target image that shows the target pose.

In an example, the flow includes operation 1006, where the computer system generates a first warped image based on the first image and the target pose. The first image may be warped in a UV space based on the first pose and the target pose to generate the first warped image.

In an example, the flow includes operation 1008, where the computer system determines a visibility map based on the first pose and the target pose. The visibility map can indicate a region in the target image that is also available in the first image. For instance, the visibility map may be a binary mask.

In an example, the flow includes operation 1010, where the computer system determines a number of points common to the first pose and the target pose. Grid points on the first image and the second image that share the same UV values refer to the same locations in the 3D human body. Due to occlusion, only visible grid points may be mapped to 2D pixel space, and the visible grip points correspond to the number of points that are common between the first pose and the target pose.

In an example, the flow includes operation 1012, where the computer system determines that the number of points exceeds a threshold number. The threshold number may be any suitable number, such as 30. The computer system can compare the number of points to the threshold number to determine whether the number of points exceeds the threshold number.

In an example, the flow includes operation 1014, where the computer system generates a garment image from the first image. The garment image is generated if the number of points exceeds the threshold number. Generating the garment image can involve extracting the garment from the first image. Thus, the garment image shows the garment in the first pose.

In an example, the flow includes operation 1016, where the computer system generates a second warped image based on the garment image and the target pose. The garment image can be warped in a pixel space based on the first pose and the target pose. The warping may involve a TPS transformation that transforms the garment to the target pose using the visibility map.

Figure 11:
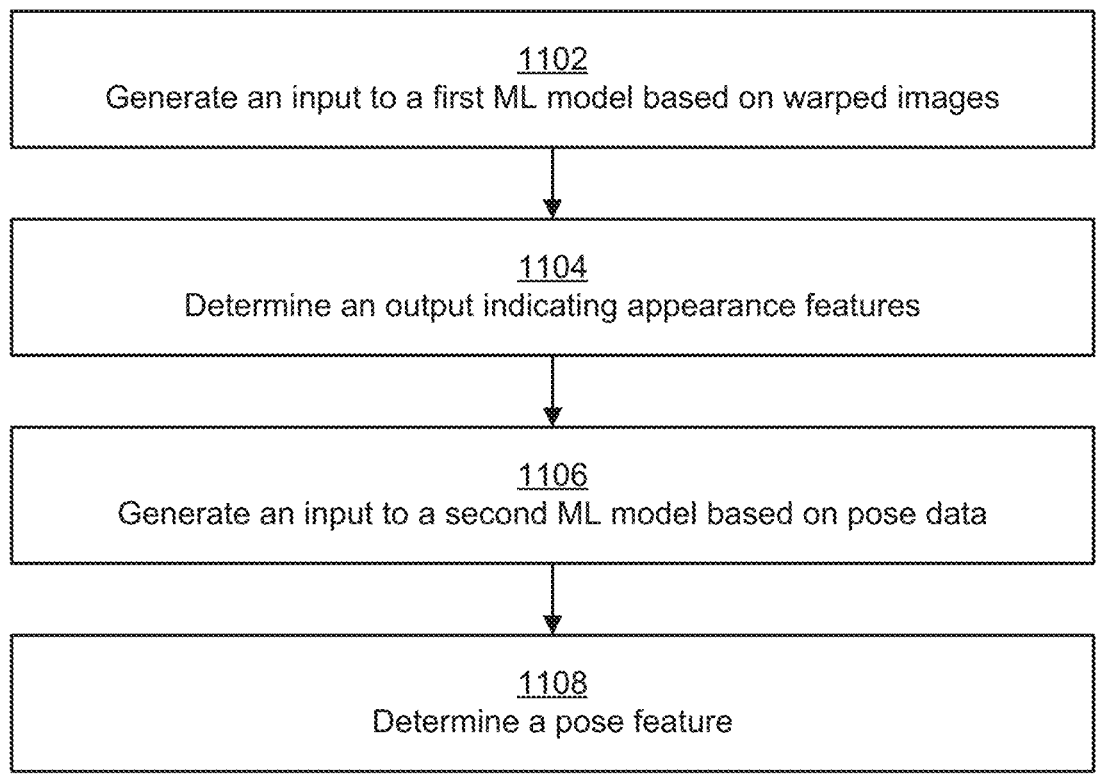
FIG. 11 illustrates an example of a flow for generating a pose feature for a target pose and appearance features of input images, according to an embodiment of the present disclosure.

FIG. 11 illustrates an example of a flow for generating a pose feature for a target pose and appearance features of input images, according to an embodiment of the present disclosure. In an example, the flow includes operation 1102, where the computer system generates an input to a first ML model based on warped images. The first ML model may be the appearance ML model 558 in FIG. 5. For each input image, the warped images can include a first warped image of the image warped in a UV space based on a target pose and a second warped image of a garment image warped in a pixel space based on a target pose. The garment image can be generated from the image and can show a garment in the image.

In an example, the flow includes operation 1104, where the computer system determines an output indicating appearance features. An appearance feature can be generated for each input image, where the appearance feature is generated by encoding the first warped image and the second warped image for the input image.

In an example, the flow includes operation 1106, where the computer system generates an input to a second ML model based on pose data. The second ML model can be the pose ML model 550 in FIG. 5. The pose data is generated from a target image that shows the target pose. So, the computer system can generate the pose data of the target pose and input the pose data into the second ML model.

In an example, the flow includes operation 1108, where the computer system determines a pose feature. The second ML model can be trained to encode the pose data into the pose feature.

Figure 12:
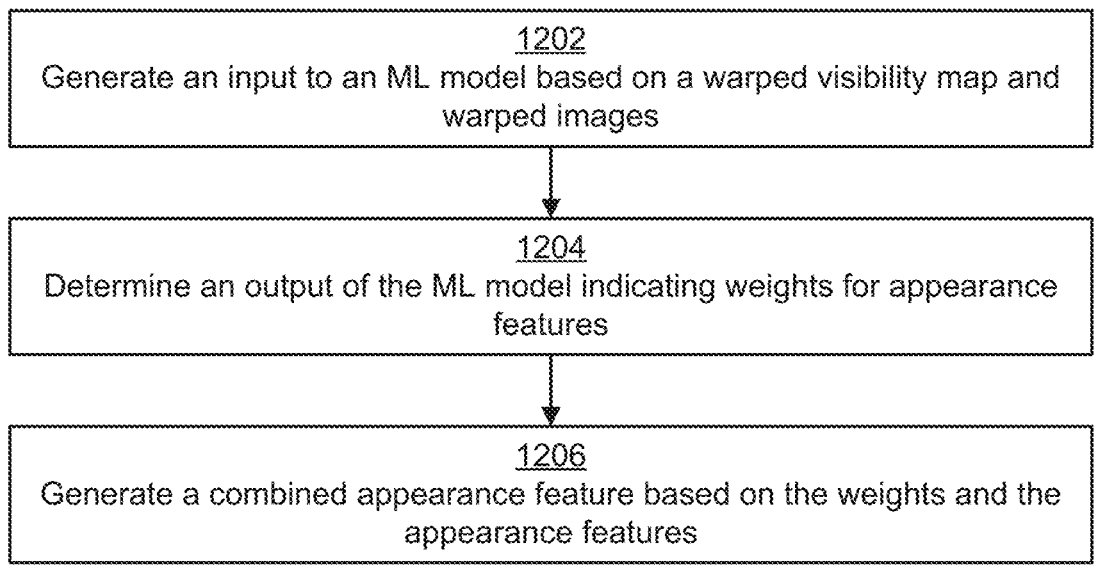
FIG. 12 illustrates an example of a flow for fusing appearance features of input images, according to an embodiment of the present disclosure.

FIG. 12 illustrates an example of a flow for fusing appearance features of input images, according to an embodiment of the present disclosure. In an example, the flow includes operation 1202, where the computer system generates an input to an ML model based on a warped visibility map and warped images. The visibility map can indicate a region in the target image that is also available in the first image. The warped images can be input images warped in a UV space based on a target pose shown in a target image. The ML model can include two 3×3 convolutions separated by a ReLU activation function to transform the visibility map and the warped images to a learned single-channel confidence map.

In an example, the flow includes operation 1204, where the computer system determines an output of the ML model indicating weights for appearance features. Each input image can be associated with an appearance feature. The weights can be indicated by the confidence map that is output by the ML model. So, a first input image can have an appearance feature associated with a first weight and a second input image can have an appearance feature associated with a second weight, as indicated by the output.

In an example, the flow includes operation 1206, where the computer system generates a combined appearance feature based on the weights and the appearance features. For instance, the combined appearance feature may be generated based on weighted averaging of the appearance features using the weights.

Figure 13:
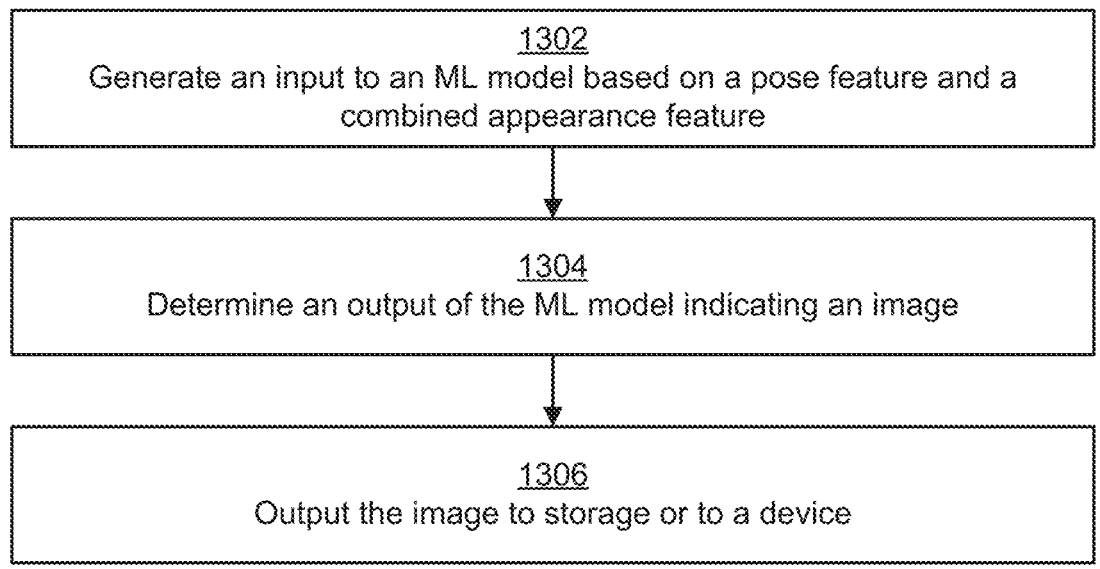
FIG. 13 illustrates an example of a flow for decoding an image, according to an embodiment of the present disclosure.

FIG. 13 illustrates an example of a flow for decoding an image, according to an embodiment of the present disclosure. In an example, the flow includes operation 1302, where the computer system generates an input to an ML model based on a pose feature and a combined appearance feature. The ML model can be the output ML model 562 in FIG. 5. Generation of the pose feature and the combined appearance feature is described in FIGS. 11-12.

In an example, the flow includes operation 1304, where the computer system determines an output of the ML model indicating an image. The image can include a person or other element in a target pose wearing a garment. The image may be a repositioning from input images of the person wearing the garment in other poses, or the image may be a virtual try-on of a different person than the input images wearing the garment in the target pose.

In an example, the flow includes operation 1306, where the computer system outputs the image to storage or to a device. The computer system may output the image to the device in response to a request from the device for the image. Or, the computer system may store the device for use in subsequent image generations or for providing in response to future requests.

Figure 14:
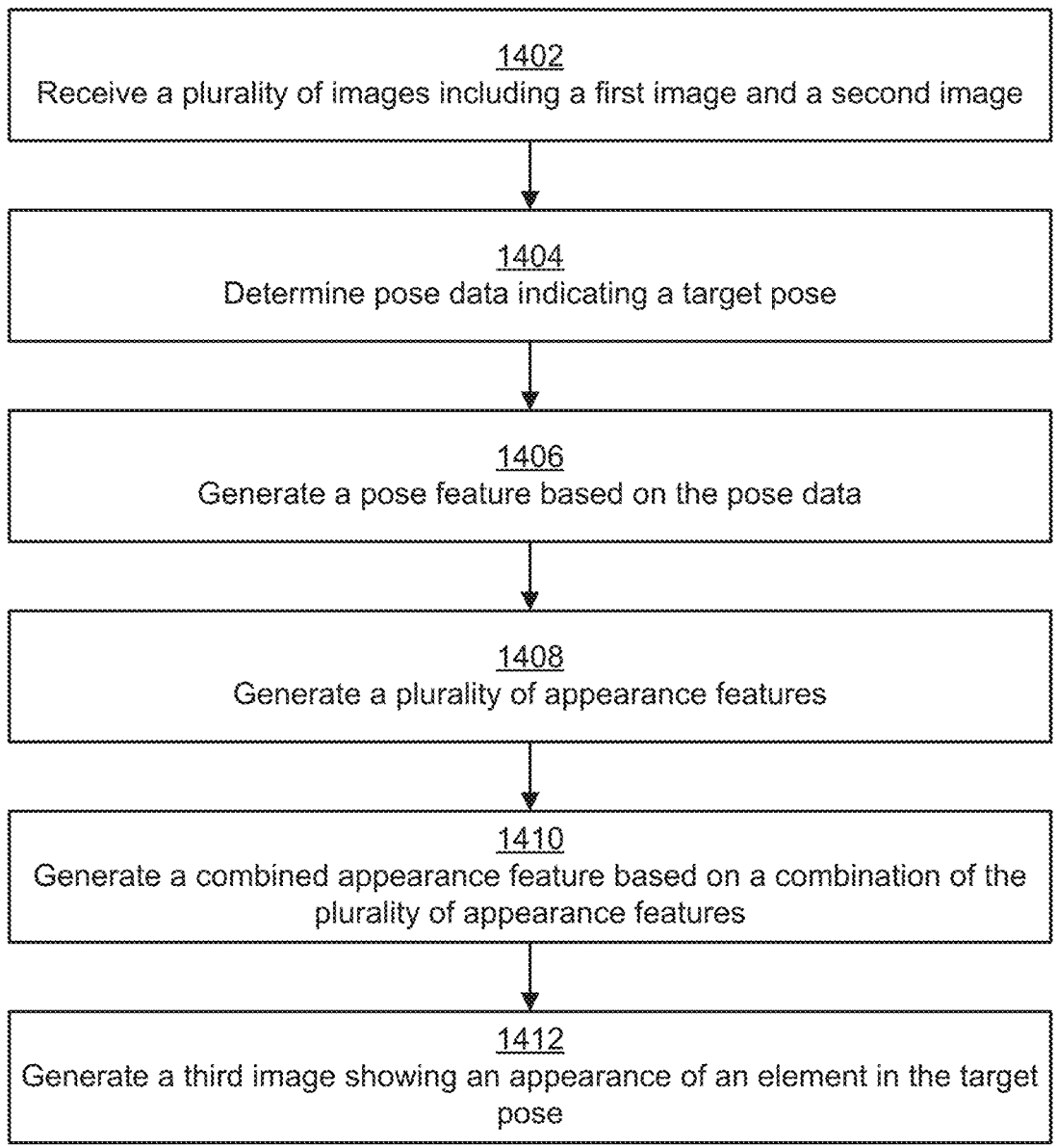
FIG. 14 illustrates an example of a flow for an overall process of generating images from a multi-image set and pose data, according to an embodiment of the present disclosure.

FIG. 14 illustrates an example of a flow for an overall process of generating images from a multi-image set and pose data, according to an embodiment of the present disclosure. In an example, the flow includes operation 1402, where the computer system receives a plurality of images including a first image and a second image. The first image can show a first appearance of a first element in a first pose and the second image can show a second appearance of the first element in a second pose.

In an example, the flow includes operation 1404, where the computer system determines pose data indicating a target pose. The pose data can be determine from a target image showing the target pose.

In an example, the flow includes operation 1406, where the computer system generates a pose feature. The pose feature represents the target pose and may be generated by a first ML model. Generating the pose feature is described in FIG. 11.

In an example, the flow includes operation 1408, where the computer system generates a plurality of appearance features. The appearance features may be generated by a second ML model. A first appearance feature is generated based on the first image and the pose data and a second appearance feature is generated based on the second image and the pose data. Generating the appearance features is described in FIG. 11.

In an example, the flow includes operation 1410, where the computer system generates a combined appearance feature based on a combination of the plurality of appearance features. Generating the combined appearance feature is described in FIG. 12.

In an example, the flow includes operation 1412, where the computer system generates a third image showing an appearance of an element in the target pose. The third image may be generated by a third ML model based on the pose feature and the combined appearance filter. Generating the third image is described in FIG. 13.

Figure 15:
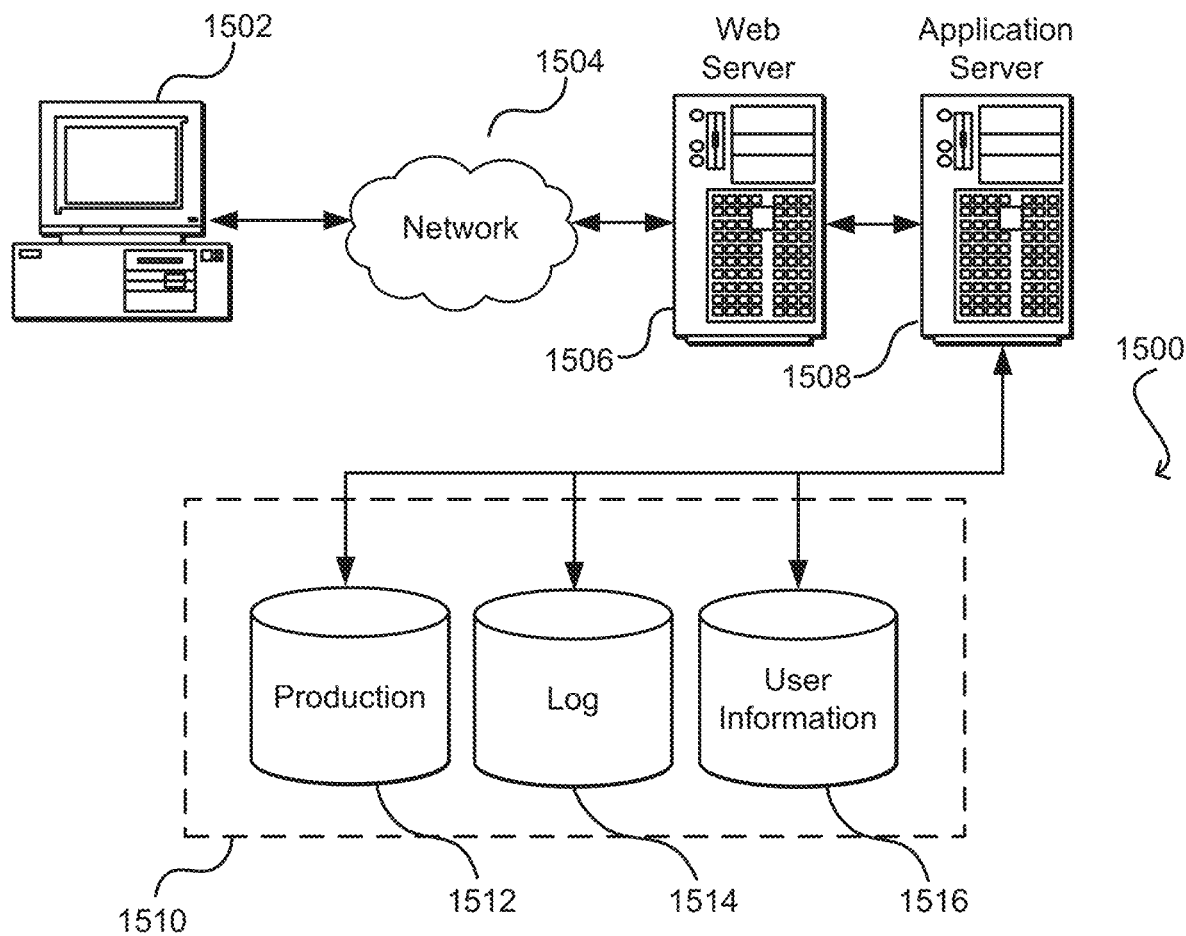
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java©, C, C#, or C++, or any scripting language, such as Perl, Python, or TCL, as well as combinations thereof. The server(s) may also include database servers, including without limitation those commercially available from Oracle©, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memories storing instructions that, upon execution by the one or more processors, configure the system to:
      receive a plurality of images including a first image and a second image, the first image showing a first appearance of a first element in a first pose, the second image showing a second appearance of the first element in a second pose;
      determine pose data indicating a target pose;
      generate, by at least using a first machine learning model, a pose feature based at least in part on the pose data;
      generate, by at least using a second machine learning model, a plurality of appearance features including a first appearance feature and a second appearance feature, the first appearance feature generated based at least in part on the first image and the pose data, the second appearance feature generated based at least in part on the second image and the pose data;
      generate a combined appearance feature based at least in part on a combination of the plurality of appearance features; and
      generate, by at least using a third machine learning model, a third image based at least in part on the pose feature and the combined appearance feature, the third image showing a third appearance of a second element in the target pose, the second element being the same as or different from the first element.

2. The system of claim 1, wherein the one or more memory store further instructions that, upon execution by the one or more processors, configure the system to:
   receive, from a device, data indicating a fourth image that shows a fourth appearance of the first element in the target pose, wherein the first element is a person, wherein the first appearance and the second appearance correspond to a same garment on the person, and wherein fourth appearance corresponds to a different garment on the person;

receive, from the device, a repose request to the target pose; and send, to the device, the third image, wherein the third appearance corresponds to the same garment, and wherein the third image shows the person and at least a portion of the same garment in the target pose.

3. The system of claim 1, wherein the one or more memory store further instructions that, upon execution by the one or more processors, configure the system to:

receive, from a device, data indicating a fourth image that shows a fourth appearance of the second element in the target pose, wherein the second element is a different person than the first element, wherein the first appearance and the second appearance correspond to a same garment, and wherein fourth appearance corresponds to a different garment;

receive, from the device, a try-on request associated with the same garment; and send, to the device, the third image, wherein the third appearance corresponds to the same garment, and wherein the third image shows the different person and at least a portion of the same garment in the target pose.

4. The system of claim 1, wherein the one or more memory store further instructions that, upon execution by the one or more processors, configure the system to:

generate a first warped image by at least warping the first image in a UV space based at least in part on the first pose and the target pose;

generate a garment image by determining a garment shown in the first image as part of the first appearance, wherein the garment image shows the garment in the first pose;

generate a second warped image by at least warping the garment image in a pixel space based at least in part on the first pose and the target pose; and generate the first appearance by at least using the first warped image and the second warped image as input to the second machine learning model.

5. A method implemented by a system, the method comprising:

generating, by at least using a first machine learning model, a pose feature based at least in part on pose data that indicates a target pose;

generating, by at least using a second machine learning model, a first appearance feature based at least in part on a first image and the pose data;

generating, by at least using the second machine learning model, a second appearance feature based at least in part on a second image and the pose data;

generating a combined appearance feature based at least in part on a combination of the first appearance feature and the second appearance feature; and generating, by at least using a third machine learning model, a third image based at least in part on the pose feature and the combined appearance feature, the third image showing an appearance of an element in the target pose.

6. The method of claim 5, further comprising:

generating the pose data from a fourth image that shows the target pose; and generating an input to the first machine learning model, the input comprising the pose data, and the first machine learning model trained to encode the pose data into the pose feature.

7. The method of claim 5, further comprising:

generating a first warped image by at least warping the first image based at least in part on the pose data; and generating an input to the second machine learning model, the input comprising the first warped image.

8. The method of claim 7, further comprising:

generating a garment image from the first image, wherein the garment image shows a garment also shown in the first image;

generating a second warped image by at least warping the garment image based at least in part on the pose data; and including the second warped image in the input.

9. The method of claim 8, wherein warping the first image is performed in a UV space, wherein warping the garment image is performed in a pixel space, and wherein the input comprises the first warped image in the UV space and the second warped image in the pixel space.

10. The method of claim 8, wherein the first appearance feature is generated as an output of the second machine learning model based at least in part on an encoding of the first warped image and the second warped image.

11. The method of claim 5, further comprising:

determining a first pose based at least in part on the first image;

determining the target pose based at least in part on a target image that shows the target pose; and determining a visibility map based at least in part on the first pose and the target pose, wherein the visibility map indicates a region in the target image that is also available in the first image, and wherein the third image is generated based at least in part on the visibility map.

12. The method of claim 11, further comprising:

generating a first warped image by at least warping the first image based at least in part on the target pose;

generating a second warped image by at least warping the second image based at least in part on the target pose;

determining, based at least in part on the visibility map, that a second region in the first warped image is unavailable from the first image;

determining, based at least in part on the visibility map, that a third region in the second warped image is unavailable from the second image;

inpainting the second region in the first warped image;

inpainting the third region in the second warped image;

generating a first input to the second machine learning model based at least in part on the first warped image and a first indication of the inpainting of the second region; and generating a second input to the second machine learning model based at least in part on the second warped image and a second indication of the inpainting of the third region.

13. One or more non-transitory computer-readable storage media storing instructions that, upon execution by a system, cause the system to perform operations comprising:

generating, by at least using a first machine learning model, a pose feature based at least in part on pose data that indicates a target pose;

generating, by at least using a second machine learning model, a first appearance feature based at least in part on a first image and the pose data;

generating, by at least using the second machine learning model, a second appearance feature based at least in part on a second image and the pose data;

generating a combined appearance feature based at least in part on a combination of the first appearance feature and the second appearance feature; and generating, by at least using a third machine learning model, a third image based at least in part on the pose feature and the combined appearance feature, the third image showing an appearance of an element in the target pose.

14. The one or more non-transitory computer-readable storage media of claim 13 storing further instructions that, upon execution by the system, cause the system to perform additional operations comprising:

generating a garment image from the first image, wherein the garment image shows a garment also shown in the first image;

determining a number of points shown in the first image and a target image and common to a first pose and the target pose, wherein the target image shows the target pose and the first image shows the first pose;

determining that the number of points exceeds a threshold number;

generating a warped image by at least warping the garment image based at least in part on the pose data; and generating an input to the second machine learning model based at least in part on the warped image.

15. The one or more non-transitory computer-readable storage media of claim 13 storing further instructions that, upon execution by the system, cause the system to perform additional operations comprising:

determining a first weight associated with the first appearance feature; and determining a second weight associated with the second appearance feature, wherein the combined appearance feature is generated based at least in part on the first weight and the second weight.

16. The one or more non-transitory computer-readable storage media of claim 15 storing additional instructions that, upon execution by the system, cause the system to perform further operations comprising:

determining a first pose based at least in part on the first image;

determining the target pose based at least in part on a target image that shows the target pose; and determining a visibility map based at least in part on the first pose and the target pose, wherein the visibility map indicates a region in the target image that is also available in the first image, and wherein the first weight and the second weight are determined based at least in part on the visibility map.

17. The one or more non-transitory computer-readable storage media of claim 15 storing additional instructions that, upon execution by the system, cause the system to perform further operations comprising:

determining a first pose based at least in part on the first image;

determining the target pose based at least in part on a target image that shows the target pose; and determining a visibility map based at least in part on the first pose and the target pose;

generating a warped image by at least warping the first image based at least in part on the pose data; and generating an input to a fourth machine learning model based at least in part on the visibility map and the warped image, wherein an output of the fourth machine learning model indicates the first weight and the second weight.

18. The one or more non-transitory computer-readable storage media of claim 13 storing further instructions that, upon execution by the system, cause the system to perform additional operations comprising:

determining, by at least using the third machine learning model, a scaling factor and a bias factor based at least in part on the combined appearance feature derived using the first image and the second image, wherein the third image is generated based at least in part on the scaling factor and the bias factor.

19. The one or more non-transitory computer-readable storage media of claim 13 storing further instructions that, upon execution by the system, cause the system to perform additional operations comprising:

training the third machine learning model to generate images based at least in part on a fourth machine learning model trained to distinguish between an actual patch from an image and a synthesized patch.

20. The one or more non-transitory computer-readable storage media of claim 13 storing further instructions that, upon execution by the system, cause the system to perform additional operations comprising:

receiving, from a device, a repose request to the target pose or a try-on request associated with a same garment that is included in the first image and the second image, wherein the appearance of the element shown in the third image is based at least in part on the repose request or the try-on request.

* * * * *